United States Patent Office 3,274,122
Patented Sept. 20, 1966

3,274,122
PREPARATION OF PARTIALLY SULPHIDED NICKEL CATALYSTS
Peter Desmond Holmes and Kenneth Hugh Bourne, Sunbury-on-Thames, England, assignors to The British Petroleum Company Limited, London, England, a British joint-stock corporation
No Drawing. Filed Feb. 20, 1963, Ser. No. 260,046
Claims priority, application Great Britain, Mar. 5, 1962, 8,390/62
7 Claims. (Cl. 252—439)

This invention relates to a process for the production of an improved catalyst. This invention also relates to reactors containing said catalyst.

It is well known that elemental nickel catalysts can be produced by the conversion of nickel compounds, alone or carried on a support, and that a freshly formed catalyst when so produced is unstable when exposed to air, reacting with considerable evolution of heat.

We have now found that these catalysts, after treatment with certain sulphur compounds, as hereinafter described, and oxidation are rendered stable to air while retaining catalytic activity for certain applications.

According to the present invention there is provided a process for the production of a catalyst which comprises treating a nickel compound, which is capable of conversion to elemental nickel, under conditions such that finely divided, or dispersed, elemental nickel is formed, thereafter treating the nickel with a sulphur compound selected from the thiophenes, thiacycloalkanes and dialkylmonosulphides, whereby the nickel is partially sulphided, and thereafter treating the partially sulphided nickel catalyst with a free oxygen-containing gas to effect surface oxidation of said catalyst.

We have found that sulphur-containing compounds hereinbefore described are only effective for a limited degree of sulphiding; thus after a certain degree of sulphiding is reached, the use of further quantities of sulphur-containing compounds does not substantially change the degree of sulphiding. In some cases the degree of sulphiding may be substantially independent of the sulphiding conditions and thus the degree of sulphiding will be determined by the selection of the sulphur-containing compound.

Sulphiding conditions which may be varied include temperature, pressure and flow rate. Usually the sulphiding agent will be used in the vapor phase or as a solution in a solvent.

By the use of an organic sulphur compound which is only capable of effecting a limited degree of sulphiding it is possible to obtain a catalyst which has been uniformly sulphided on the surface thereof. Thus while it would be possible to use, for sulphiding, a calculated quantity of an organic sulphur compound which does not possess this property, the resulting catalyst will be sulphided to an undesirably high degree when the catalyst surface is readily accessible to the organic sulphur compound; while it is possible to achieve an average degree of sulphiding equal to a required value, the catalyst will be in part, over-active and, in part, under active.

Catalysts may be produced in accordance with the present invention by the use of unsupported nickel compounds, for example nickel formate which is converted by heat directly to elemental nickel, or nickel oxide which reduces in hydrogen to elemental nickel. Preferably, however, the nickel compound is first deposited on a catalyst support.

The preparation of the catalyst and its activation may be carried out in any convenient manner, the following three methods being merely illustrative.

(a) The catalyst may be prepared on the base by an impregnation technique by dissolving in water a nickel salt, for example nickel nitrate, and impregnating the support material with it. The support material may be conveniently in the form of granules or pellets of any desired size formed from ground support material. After impregnation, the catalyst is dried and is then in a form in which it can be stored for long periods without deterioration. In order to use the catalyst, it must be activated by heating to decompose the salt; in the case of the nitrate this requires a temperature of about 500–550° C., and the nickel will be converted to the oxide. Final activation by reduction to metallic nickel can be carried out in a stream of hydrogen or hydrogen containing gas at a temperature of 150° to 600° C. and at a pressure of 0–200 lbs./sq. in. gauge. The time of treatment depends upon the temperature. Typical conditions using a sepiolite catalyst support are 16 hours at 500° C. and atmospheric pressure; no damage results to the sepiolite however, if it is heated at a temperature above 600° C.

(b) The catalyst may be prepared by milling dry nickel formate with powdered catalyst support, and the mixture subsequently pelleted. The advantage of this method of preparation is that a salt such as nickel formate reduces directly to nickel (without going through the oxide state) in a non-oxidizing atmosphere, for example in an inert gas or hydrogen stream at a temperature of 150° C. to 300° C. At 250° C. treatment for 4 hours will usually be appropriate. This method has the advantage that it is not necessary to heat large quantities of catalysts to temperatures of 500° C. and higher.

(c) The catalyst may be prepared by a technique which utilises the water soluble complex formed when nickel formate dissolves in ammonia. This complex breaks down on heating to give nickel formate again. By using this water-soluble complex, catalysts may be prepared by the impregnation technique from normally water insoluble compounds such as nickel formate. The compound is dissolved in ammonia solution and the solution used for the impregnation of granules or pellets of the support material; the catalyst is then dried, and activation is carried out by the method described under (b).

After reduction, the nickel catalyst should not be allowed to come into contact with air or spontaneous oxidation of the nickel to nickel oxide may occur.

Preferably the activated catalyst contains 2 to 20% by weight of elemental nickel, based on the total weight of catalyst.

Suitable catalysts for treatment with a sulphur-containing material in accordance with the invention are nickel supported on alumina, Kieselguhr, chalk and silica gel.

A preferred catalyst is nickel-on-sepiolite.

Sepiolite is a commercially available clay mineral, which occurs naturally and which can also be prepared synthetically. It has the ideal formula $$H_4Mg_9Si_{12}O_{30}(OH)_{10} \cdot 6H_2O$$

and is also known as Meershaum. Further information on sepiolite and its properties may be found in "Chemistry and Industry" of November 16, 1957, at pages 1492 and 1495.

Sepiolite possesses an advantage over some other bases, for example alumina, in that there is no reaction of the nickel salt with sepiolite during the heating of the catalyst to convert the nickel salt to oxide, and the final reduction can be carried out at a lower temperature than that necessary for nickel-alumina catalysts.

A preferred class of organic sulphur compounds for use in the production of the catalyst consists of the thiophenes. As stated hereinbefore, it has been found that these compounds are capable of sulphiding the nickel catalyst to a satisfactory extent, that is without excessive sulphide formation, even when used in excess of the amount required to provide the required amount of sulphur. Preferred thiophenes have 4 to 10 carbon atoms/molecule. Suitably there is used, for modifying the catalyst, a gasoline containing sulphur predominantly or entirely present as thiophenes. A preferred gasoline is a steam cracked gasoline produced by cracking, in the presence of steam, petroleum distillate fractions, for example Primary Flash Distillate or naphthas, fractions preferably boiling within the range 50° C. to 250° C. Preferred cracking temperatures for the production of gasolines for use in the process of the invention exceed 1100° F. (593° C.): suitable temperatures lie in the range of 1100° F. to 1400° F. (593–760° C.) and suitable cracking pressures lie in the range 0 to 60 lbs./sq. in. gauge. Preferably the gasolines have a total sulphur content of 0.005 to 0.2% by weight. When the sulphur-containing compound is a thiacycloalkane this preferably has at least 4 carbon atoms per ring.

Usually the treatment of the catalyst to cause sulphiding will be carried out at a temperature from 0–200° C. and at any convenient pressure, being sub-atmospheric, atmospheric or super atmospheric.

Preferably the treatment of the catalyst is carried out in the presence of hydrogen.

Usually the amount of the sulphur-containing material which is reacted with the catalyst will be such that it contains 1 to 40 mol percent of sulphur, based on the elemental nickel content of the unreacted catalyst.

After treatment of the catalyst to cause sulphiding, the partially sulphided catalyst will be treated with a free oxygen-containing gas. Usually this treatment will lead to the evolution of considerable heat. Preferably the catalyst is treated with a stream of free oxygen-containing gas. The gas employed may be air. However, by reason of the desirability of limiting the extent of rise in the temperature of the catalyst it may be necessary or advisable to use, at the outset, a gas having a lower concentration of oxygen than air; thus there may be used, initially, a mixture of air and a gas which is inert to the catalyst, for example, nitrogen and preferably the treatment will thereafter be carried out using air.

It is believed that, during the sulphiding treatment, sulphur atoms are bonded to some but not all of the surface of the nickel (which, when using a supported nickel catalyst, will usually be in the form of small crystallites). It is believed that during the subsequent treatment with an oxygen-containing gas at least some of the nickel atoms, in the surface, which are unsulphided are bonded to oxygen. It is possible that oxygen is also bonded during this stage to the sulphided nickel.

When a body of catalyst is treated in accordance with the invention, there will be a marked temperature rise, during the oxygen treatment, in the zone of said body of catalyst in which, at given time, the up-take of oxygen is occurring most vigorously; this zone will move progressively through the body of the catalyst.

Preferably the treatment with an oxygen-containing gas is carried out while maintaining the temperature of the body of catalyst undergoing treatment at a level such that the temperature in all zones in the body of said catalyst lies at a temperature below 250° C. Preferably the temperature of the catalyst lies in the range 20–100° C. during the treatment with the oxygen-containing gas.

It is an advantage of catalysts produced according to the invention that they are suitable for production in larger quantities than are required in any one plant; by reason of their stability to air they are suitable for transportation. Thus the provision of special equipment, at the locations at which they are required, for activation of catalysts by conversion of nickel compounds to elemental nickel, may be avoided.

Thus according to another aspect of the present invention there is provided a reactor, charged with catalyst, said catalyst having been obtained by treating a nickel compound, which is capable of conversion to elemental nickel, under conditions such that finely divided, or dispersed, elemental nickel is formed and thereafter treating the nickel with a sulphur compound selected from the thiophenes, thiacycloalkanes and dialkylmonosulphides, and thereafter with an oxygen-containing gas to effect surface oxidation, said catalyst, after the treatment with the oxygen-containing gas being charged into said reactor.

The catalysts according to the present invention are not, in general, as active as elemental nickel catalysts which have not been treated with sulphur compounds. While this will debar them from use in processes in which a highly active catalyst is required, there are certain processes for which they will be found superior to the untreated nickel catalysts; thus the catalysts are very suitable for use in certain selective hydrogenation processes as described in British patent specifications 989,301, 989,-302, 972,245 and 979,307. The catalysts are also suitable for use in isomerisation processes, for example as described in British Patent 1,002,394.

Thus the catalyst may be employed for the selective hydrogenation of steam cracked gasoline for the destruction of gum forming constituents, for example dienes, without substantial conversion of mono-olefins to paraffins. Preferred operating conditions for effecting this hydrogen-action stage are described in British patent specification 858,343. A material containing an organic sulphur compound suitable for use in the pre-treatment of the catalyst is a steam cracked gasoline having a sulphur content in the rang 0.005 to 0.04% by wt. the gasoline having been obtained at a cracking temperature above 1100° F.

The nickel compound used in the formation of the catalyst may be comprised in a nickel catalyst which has been spent in a hydrogenation reaction for example the treatment of steam-cracked gasoline as hereinbefore described. The spent catalyst will preferably be treated for the conversion of its nickel content to a nickel compound as hereinbefore described before reconversion to elemental nickel and treatment with a sulphur compound in accordance with the process hereinbefore described.

The invention is illustrated but not limited with reference to the following examples.

*Example*

10 ml. samples of nickel formate on sepiolite catalyst (containing 9.95% by wt. of nickel based on dried catalyst) prepared by impregnation of sepiolite with an ammonia solution of nickel formate, were activated in hydrogen at 250° C. (1000 v./v./hr. for 1 hour). The catalysts were then treated with a 2 percent solution of thiophene in n-heptane (2 v./v./hr.) at 100° C. until no further $C_4$ products were observed in the products (atom ratio of S passed over catalyst to Ni=0.36–0.40). The treated catalysts were then exposed to various amounts of air at various tempertaures (as shown in the table) and activity tests carried out with a 10 percent blend of isoprene in n-heptane at atmospheric pressure, 100° C., ca. 2 vol./vol./hour in the presence of hydrogen. In run 16 the treatment with air was carried out in two stages after an initial activity test on a freshly sulphided sample. Composition of the $C_5$ products from the activity test is shown in the table.

TABLE

| Run No. | Thiophene Treatment Temp., °C | Sulphur on Catalyst S/Ni | Air Treatment Temperature, °C | Air Treatment Volume, litres | Unconverted | Monoolefins, percent wt. | Paraffins, percent wt. |
|---|---|---|---|---|---|---|---|
| 19 | | 0.007 | | Nil | 0.2 | Nil | 99.8 |
| 16 | 108–115 | 0.076 | 111 | Nil | Nil | 99.1 | 0.9 |
|    |         |       |     | 4   | Nil | 98.0 | 2.0 |
|    |         |       | 20  | 50  | Nil | 98.7 | 1.3 |
| 18 | 100–102 | 0.074 | 25–32 | 34.7 | Nil | 99.8 | 0.2 |
| 17 | 96–102  | 0.063 | 100 | 12.3 | 25.3 | 74.7 | 0.1 |
| 20 | 98–102  | ¹0.046 | Room | (²) | Nil | 99.8 | 0.2 |

¹ Calculated from butane produced.
² Stored in a bottle for 12 days.

These results show that a catalyst which is partially sulphided by treatment with thiophene retained its activity and selectivity for hydrogenation even after storage in air for 12 days. Runs 16 and 17 would indicate that activity is also partially maintained after treatment with air at 100° C.

We claim:

1. A process for the production of a catalyst which comprises: contacting a nickel compound on a support, which compound is capable of conversion to elemental nickel, under conditions such that finely divided, or dispersed, elemental nickel is formed, contacting the elemental nickel at a temperature in the range 0–200° C., with an organic sulphur compound selected from the group consisting of thiophenes, thiacycloalkanes and dialkylmonosulphides, whereby the nickel is partially sulphided with from 1 to 40 mol percent of sulphur based on the elemental nickel content of the catalyst, and thereafter contacting the partially sulphided nickel catalyst with a free oxygen-containing gas at a temperature below 250° C. to effect surface oxidation of the nickel component of the catalyst.

2. A process according to claim 1 in which the support is sepiolite.

3. A process according to claim 1 in which contact of the nickel with a sulphur compound is carried out in the presence of hydrogen.

4. A process according to claim 1 in which the sulphur is thiophene $C_4H_4S$.

5. A process according to claim 1 in which the sulphur compound is a thiacycloalkane having at least 4 carbon atoms per ring.

6. A process according to claim 1 in which the oxygen-containing gas is air.

7. A process according to claim 1 in which the nickel at 20–100° C. is contacted with the oxygen-containing gas.

References Cited by the Examiner

UNITED STATES PATENTS

| | | | |
|---|---|---|---|
| 1,955,829 | 4/1934 | Pier et al. | 252—439 |
| 2,224,071 | 12/1940 | Wasserman | 252—439 |
| 2,332,276 | 10/1943 | Stably | 252—439 |
| 2,511,453 | 6/1950 | Barry | 260—683 |
| 2,646,388 | 7/1953 | Crawford | 252—459 |
| 2,780,584 | 2/1957 | Doumani | 252—439 |
| 3,041,385 | 6/1962 | Bourne et al. | 260—677 |

FOREIGN PATENTS

| | | |
|---|---|---|
| 348,690 | 5/1931 | Great Britain. |
| 499,958 | 1/1939 | Great Britain. |
| 574,514 | 1/1946 | Great Britain. |

OSCAR R. VERTIZ, *Primary Examiner.*

MAURICE A. BRINDISI, *Examiner.*

R. M. DAVIDSON, *Assistant Examiner.*